(12) United States Patent
Neijzen et al.

(10) Patent No.: US 8,475,734 B2
(45) Date of Patent: Jul. 2, 2013

(54) FILTERING APPARATUS FOR FILTERING A FLUID

(75) Inventors: Jacobus Hermanus Maria Neijzen, Heeze (NL); Ricky Kamps, Kerkrade (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 362 days.

(21) Appl. No.: 12/919,509

(22) PCT Filed: Mar. 5, 2009

(86) PCT No.: PCT/IB2009/050902
§ 371 (c)(1),
(2), (4) Date: Aug. 26, 2010

(87) PCT Pub. No.: WO2009/112982
PCT Pub. Date: Sep. 17, 2009

(65) Prior Publication Data
US 2011/0005341 A1  Jan. 13, 2011

(30) Foreign Application Priority Data
Mar. 11, 2008 (EP) .................................... 08102506

(51) Int. Cl.
*G01N 33/48* (2006.01)
(52) U.S. Cl.
USPC ............................. 422/408; 422/417; 422/422
(58) Field of Classification Search
USPC ................................................ 422/408–423
See application file for complete search history.

(56) References Cited

U.S. PATENT DOCUMENTS

| | | | |
|---|---|---|---|
| 3,964,871 A * | 6/1976 | Hochstrasser | 435/10 |
| 4,212,742 A | 7/1980 | Solomon et al. | |
| 4,491,012 A * | 1/1985 | Peterson | 73/61.63 |
| 4,751,003 A | 6/1988 | Raehse et al. | |
| 4,753,776 A | 6/1988 | Hillman et al. | |
| 4,797,211 A | 1/1989 | Ehrfeld et al. | |
| 4,883,764 A * | 11/1989 | Kloepfer | 436/63 |
| 4,906,439 A | 3/1990 | Grenner | |
| 4,943,522 A * | 7/1990 | Eisinger et al. | 435/7.25 |
| 5,187,100 A * | 2/1993 | Matzinger et al. | 436/16 |
| 5,208,163 A * | 5/1993 | Charlton et al. | 436/63 |
| 5,306,623 A * | 4/1994 | Kiser et al. | 435/14 |
| 5,627,041 A * | 5/1997 | Shartle | 435/7.24 |
| 5,843,691 A * | 12/1998 | Douglas et al. | 435/14 |
| 5,922,210 A | 7/1999 | Brody et al. | |
| 6,001,307 A * | 12/1999 | Naka et al. | 422/81 |
| 6,818,180 B2 * | 11/2004 | Douglas et al. | 422/417 |

(Continued)

FOREIGN PATENT DOCUMENTS
EP 0974840 A2 1/2000
EP 1611955 A1 1/2006
WO WO 01-24931 A1 * 4/2001

*Primary Examiner* — David Rogers

(57) ABSTRACT

A filtering apparatus for filtering a fluid includes a filter element for filtering the fluid and an adhesive capillary structure for generating capillary forces. The adhesive capillary structure is attached to the filter element by using an adhesive property of the adhesive capillary structure. The adhesive capillary structure is preferentially made of a double-sided tape, which is adhesive on two sides. The filtering apparatus further includes a filtering location where the filter element is located, and a detection location where a property of the fluid is detectable. The capillary structure is formed such that the filtered fluid is guided from the filtering location to the detection location.

14 Claims, 8 Drawing Sheets

U.S. PATENT DOCUMENTS

| | | |
|---|---|---|
| 7,022,286 B2 * | 4/2006 | Lemke et al. .................. 422/67 |
| 7,238,534 B1 * | 7/2007 | Zimmer ........................ 436/169 |
| 7,476,202 B2 * | 1/2009 | Raney et al. .................. 600/583 |
| 7,723,120 B2 * | 5/2010 | Xiao et al. .................... 436/164 |
| 7,727,467 B2 * | 6/2010 | Burke et al. .................. 422/412 |
| 7,887,750 B2 * | 2/2011 | Blatt et al. .................... 422/423 |
| 8,053,226 B2 * | 11/2011 | Schwind et al. ........... 435/287.2 |
| 8,193,002 B2 * | 6/2012 | Guo et al. ..................... 436/514 |
| 8,252,139 B2 * | 8/2012 | Pankow ........................ 156/293 |
| 2002/0179447 A1 | 12/2002 | Sundberg et al. |
| 2003/0156983 A1 * | 8/2003 | Shartle et al. .................. 422/57 |
| 2003/0210287 A1 * | 11/2003 | Harding et al. ................... 347/1 |
| 2006/0063267 A1 * | 3/2006 | Lawrence et al. ............... 436/71 |

* cited by examiner

FILTERING APPARATUS FOR FILTERING A FLUID

FIELD OF THE INVENTION

The present invention relates to a filtering apparatus and a filtering method for filtering a fluid. The invention relates further to a method for producing a filtering apparatus for filtering a fluid.

BACKGROUND OF THE INVENTION

A filtering apparatus for filtering a fluid is, for example, a cartridge comprising a blood separation filter situated in a filtering part, wherein the filtering part is connected by a fluidic channel with a detection part. If blood is deposited on the blood separation filter, blood plasma is separated from whole blood and the blood plasma is guided from the filtering part to the detection part via the fluidic channel. In the detection part a detection unit is present for detecting a property of the blood plasma.

To optimize the filtering and detection procedure, in particular, in order to decrease the time between putting a blood drop on the blood separation filter and getting results from the detection unit, the blood separation filter in the filtering part, the detection part and the fluidic channel have to be aligned accordingly. This alignment is time consuming, complicates the manufacturing of the cartridge and can be disturbed by external influences like external shocks or impacts.

SUMMARY OF THE INVENTION

It is therefore an object of the present invention to provide a filtering apparatus and a filtering method for filtering a fluid and a method for producing a filtering apparatus for filtering a fluid, wherein a more simple and robust assembly of the apparatus is provided.

In an aspect of the present invention a filtering apparatus for filtering a fluid is presented, wherein the filtering apparatus comprises:
  a filter element for filtering the fluid,
  an adhesive capillary structure for generating capillary forces,
  wherein the adhesive capillary structure is attached to the filter element by using an adhesive property of the adhesive capillary structure.

The invention is based on the idea that by comprising an adhesive capillary structure for generating capillary forces, wherein the adhesive capillary structure is attached to the filter element by using the adhesive property of the adhesive capillary structure, the capillary structure can be used for transporting the fluid, in particular for pulling the fluid through the filter, wherein an alignment between the capillary structure and the filter element is maintained by the adhesive properties of the adhesive capillary structure. In addition, by using an adhesive capillary structure, only one element is used for providing two functions, i.e. the attachment of the capillary structure to the filter and the transporting of the fluid by the capillary structure. These features lead to a more simple and robust assembly of the filtering apparatus.

The filtering apparatus is preferably adapted for filtering blood or saliva or any other fluid, in particular, any other body fluid like urine. The filter element is preferably a blood separation filter, wherein the blood plasma can pass and blood cells cannot pass. It is further preferred that the filter element is an asymmetric membrane filter, for example a BTS-SP300 filter of the company Pall.

The capillary structure is preferentially a microfluidic structure, which preferentially generates capillary forces, in particular for pulling the fluid through the filter element.

The filtering apparatus is preferably used for a point-of-care diagnosis.

The filter element comprises preferentially a first surface, on which the fluid is to be deposited either directly or via a deposition medium, and a second surface, through which the filter fluid should leave the filter element. The first surface and the second surface are preferentially arranged on opposing sides of the filter element. The adhesive capillary structure is preferentially attached to the second surface of the filter element.

Preferentially a central part of the filter element is attached to the adhesive capillary structure, in particular, a central part of the second surface is attached to the adhesive capillary structure. It is also preferred that more than 25 percent, further preferred more than 50 percent and preferentially 80 percent of the second surface of the filter element are in contact with the adhesive capillary structure.

It is preferred that the adhesive capillary structure is made of a double-sided tape, which is adhesive on two sides. In a double-sided tape a capillary structure can easily be formed with high accuracy, wherein the double-sided tape can be located between two elements, for example, between a filter element and/or a cover element, and a base element, for forming the capillary structure.

In another embodiment, the adhesive capillary structure can be a plastic injection molded micro structure, for example, a bump structure, that is covered with an adhesive material. This plastic injection molded micro structure is preferentially a bump structure in a lower cartridge part of the filtering apparatus.

It is further preferred that the filtering apparatus further comprises:
  a filtering location, at which the filter element is located, and a detection location, at which a property of the fluid is detectable,
  wherein the capillary structure is formed such that the filtered fluid is guided from the filtering location to the detection location. Since the capillary structure is formed such that the filter fluid is guided from the filtering location to the detection location, the fluid can be transported from the filtering location to the detection location fastly, wherein the adhesive capillary structure comprises the further function of guiding the fluid to the detection location through the guiding channels, thereby further improving the robustness and simplicity of the assembly.

The capillary structure preferentially forms together with a base element and a cover element a filtering cavity located at the filtering location, wherein the filtering cavity contains preferentially the filter element and wherein the filtering cavity comprises preferentially an open side for allowing the fluid to enter the filtering cavity and to be placed on the filter element. It is further preferred that the base element and the cover element form together with the capillary structure the detection cavity.

At the detection location preferentially a detection unit is located, which is adapted for determining a property of the fluid. A property of the fluid is, for example, the temperature, the viscosity, the presence of particles in the fluid, the concentration of these particles etc. The detection unit can comprise a sensor, which can be any suitable sensor to detect, for example, the presence of magnetic particles on or near to a sensors surface, based on any property of the particles, for example, it can detect via i) magnetic methods using, for example, magneto-resistive elements, Hall elements, coils, ii) optical methods using, for example, imaging techniques, fluorescence techniques, chemiluminescence techniques, absorption techniques, scattering techniques, evanescent field techniques, surface plasmon resonance techniques, Raman techniques etc., iii) sonic detection using, for example, surface acoustic waves, bulk acoustic waves, cantilevers, quartz crystals etc., iv) electrical detection using, for example, conduction, impedance, amperometric, redox cycling, v) combinations thereof, etc.

The detection unit can be adapted for detecting magnetic particles in magnetic-label biosensing. If the detection is based on a magnetic property of the particles, the sensor can be, in a preferred embodiment, any suitable sensor based on the detection of properties of the particle on or near to a sensor surface. For this purpose, the sensor comprises, for example, a coil, a magneto-resistive element, a magneto-restrictive element, a Hall element, in particular a planar Hall element, a flux gate element, a SQUID, a magnetic resonance element etc.

The filtering apparatus is preferentially formed as a cartridge, which is preferentially disposable. It is further preferred that the capillary structure forms channels, in which the fluid can be guided and transported. The detection unit is preferentially adapted for detecting low concentration biomarkers.

It is further preferred that the capillary structure comprises a connecting channel connecting the filtering location with the detection location, wherein the capillary structure comprises guiding channels located at the filtering location and wherein the guiding channels extend from an end of the connecting channel. By using this capillary structure the fluid, which has been filtered by the filter element and which is preferentially pulled through the filter element by capillary forces, is transported through the end of the connecting channel by the guiding channels and further transported to the detection location by the connecting channel. The channels are preferentially microchannels.

It is further preferred that the guiding channels extend radially from the end of the connecting channel. Such a structure of guiding channels increases the filtering rate and the amount of filtered fluid transported to the detection location per temporal unit.

It is further preferred that the guiding channels have a smaller width than the connecting channel. This allows to keep the total volume of plasma in the channels between filter and detection position as small as possible. At the same time the flow restriction of the channels can be kept as low as possible. Since the connecting channel carries the total flow coming out of the small guiding channels the connecting channel is preferentially broader. If the channels are not purely formed in a tape but also as a recess in the injection molded parts, the other dimension (the height of the channel) could also be used to have an evenly distributed flow restriction over the various channels. So the dimensions of the channels are preferentially such that there is a balance between small dead volume and evenly distributed flow restriction.

It is further preferred that the guiding channels extend to a radius outside the filter element to avoid trapping of air bubbles.

It is further preferred that at least one of the guiding channels and of the connecting channel contains a transferring element for transferring the fluid in the direction of the detection location. This can help to make the fluidic contact between the channels under the filter and the connecting channel towards the detection location. It can increase the robustness and reproducibility of the fluidic behaviour. The transferring element is preferentially a microfluidic structure, preferentially microextrusions or grooves, to locally increase the capillary forces or a cellulose element, in particular a cellulose strip, located preferentially in the connecting channel.

It is further preferred that the filtering apparatus comprises a bypass preventing unit for preventing the fluid from bypassing the filter element and flowing directly into the connecting channel. This decreases the probability of bypassing the filter and of directly flowing into the connecting channel. The bypass preventing unit is preferentially located at a location between the connecting channel and the filter element, wherein the bypass preventing unit is preferentially a strip, which is preferentially located adjacent to the filter element and preferentially arranged perpendicular to the connecting channel. In a further preferred embodiment, the bypass preventing unit is formed by sealing an edge of the filter element, for example, by micro welding or by a double-sided tape.

It is further preferred that the filtering apparatus comprises:
a detection cavity, which is located at the detection location and in which a property of the fluid is detectable,
a first part and a second part, which form together the detection cavity and which form together with the capillary structure the connecting channel, wherein the first part and the second part are attached to each other via the adhesive capillary structure. Preferentially, the first part and second part form together with the capillary structure the detection cavity, wherein the part of the capillary structure, which forms together with the first part and the second part the detection cavity, can itself be a capillary structure for generating capillary forces or can have larger dimensions.

It is further preferred that the apparatus comprises a filtering cavity, which is located at the filtering location and in which the filter element is located, wherein the first part and the second part form together the filter cavity, wherein the first part and the second part are attached to each other via the adhesive capillary structure. The filtering cavity has preferentially an open side for allowing the fluid to enter into the filtering cavity. By simply forming the connecting channel, the guiding channels, the detection cavity and/or the filtering cavity, guiding means for guiding the fluid from the filter location to the detection location can be manufactured in a more simple and robust way.

The first part and the second part are preferentially injection molded parts.

It is further preferred that the capillary structure is adapted for sealing an edge of the filter element. This integrates a further function into the capillary structure, wherein the simplicity and robustness of the assembly is further improved.

It is further preferred that a first side of the filter element, which is opposite to a second side of the filter element, which is attached to the capillary structure, is covered. The filter element may be covered by a coarse capillary structure to keep the blood in place directly after deposition and to avoid spilling. The pore size of this structure is preferentially large compared to the pore dimensions of the filter and the channels, so preferentially of the order of 0.3 mm-3 mm. Another option is to extend the upper part of the filtering apparatus, preferentially a cartridge, over the filter element, with naturally a sample entrance opening. The reasons to partly cover the filter are thus to avoid spilling of the deposited blood, to make it more shock proof, and to minimize the risk of contact between the operator of the cartridge and the blood.

It is further preferred that the filtering apparatus comprises a deposition medium, which is arranged on the filter element, for deposition of the fluid on the filter element. This allows to keep the fluid, in particular, a fluid sample, in place after deposition. The deposition medium can act as a shock proof. The deposition medium is preferentially arranged on a first side of the filter element, which is opposite to a second side of the filter element, which is attached to the capillary structure.

It is further preferred that the connecting channel extends from the filtering location to the detection location until the opposite side of the detection location, which is opposite to the filtering location, wherein a vent is located at the opposite side. This further increases the amount of fluid transported to the detection location per temporal unit.

In a further aspect of the present invention a property determination apparatus for determining a property of a fluid is presented, wherein the property determination apparatus is adapted for determining a property of a fluid located at a detection location of a filtering apparatus for filtering a fluid, the filtering apparatus comprising:
 a filter element for filtering the fluid,
 an adhesive capillary structure for generating capillary forces,
 wherein the adhesive capillary structure is attached to the filter element by using an adhesive property of the adhesive capillary structure,
 wherein the filtering apparatus further comprises:
 a filtering location, at which the filter element is located, and the detection location, at which a property of the fluid is detectable,
 wherein the capillary structure is formed such that the filtered fluid is guided from the filtering location to the detection location.

In a further aspect of the present invention a filtering method for filtering a fluid is presented, wherein the filtering method comprises the step of filtering the fluid by a filter element, to which an adhesive capillary structure for generating capillary forces is attached by using an adhesive property of the adhesive capillary structure.

In a further aspect of the present invention a method for producing a filtering apparatus for filtering a fluid is presented, wherein the method comprises following steps:
 providing a filter element for filtering the fluid,
 providing an adhesive,
 capillary structure for generating capillary forces,
 attaching the adhesive capillary structure to the filter element by using an adhesive property of the adhesive capillary structure.

It shall be understood that a preferred embodiment of the invention can also be any combination of the dependent claims with the respective independent claim.

BRIEF DESCRIPTION OF THE DRAWINGS

These and other aspects of the invention will be apparent from and elucidated with reference to the embodiments described herein after. In the following drawings.

DETAILED DESCRIPTION OF EMBODIMENTS

Figure 1:
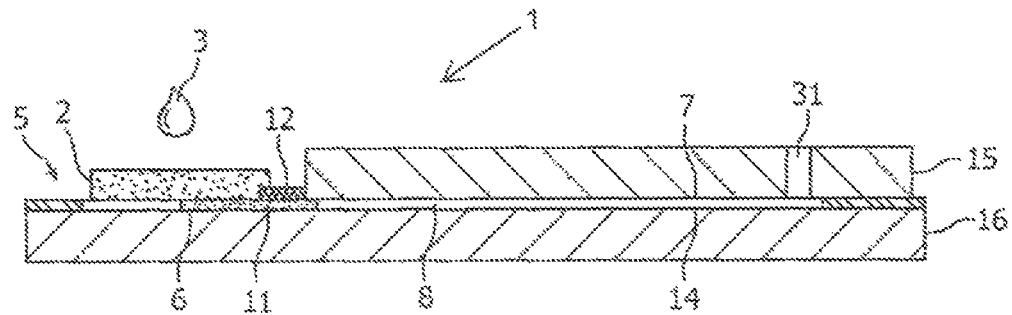
FIG. 1 shows schematically and exemplarily a sectional view of an embodiment of a filtering apparatus.

FIG. 1 shows schematically and exemplarily a filtering apparatus 1 for filtering a fluid 3. The apparatus 1 comprises a filter element 2 for filtering the fluid 3 and an adhesive capillary structure 5 for generating capillary forces. The adhesive capillary structure 5 is attached to the filter element 2 by using the adhesive properties of the adhesive capillary structure. The adhesive capillary structure is, in this embodiment, made of a double-sided tape, which is adhesive on two sides.

The apparatus further comprises a filtering location 6, at which the filter element 2 is located, and a detection location 7, at which a property of the fluid 3 is detectable, wherein the capillary structure 5 is formed such that the filtered fluid 3 is guided from the filtering location 6 to the detection location 7.

The capillary structure 5 comprises a connecting channel 8, which connects the filtering location 6 with the detection location 7, wherein the capillary structure 5 comprises guiding channels 9 located at the filtering location 6 and wherein the guiding channels 9 extend from an end 10 of the connecting channel 8. In this embodiment the guiding channels 9 extend radially from the end 10 of the connecting channel 8. Furthermore, in this embodiment, the guiding channels 9 have a smaller width than the connecting channel 8. In this embodiment, the connecting channel 8 has two widths, a smaller width between the end 10 and the detection location 7 and a larger width at the detection location 7 for forming, in this embodiment, a detection cavity, which will be explained further below.

Figure 2:
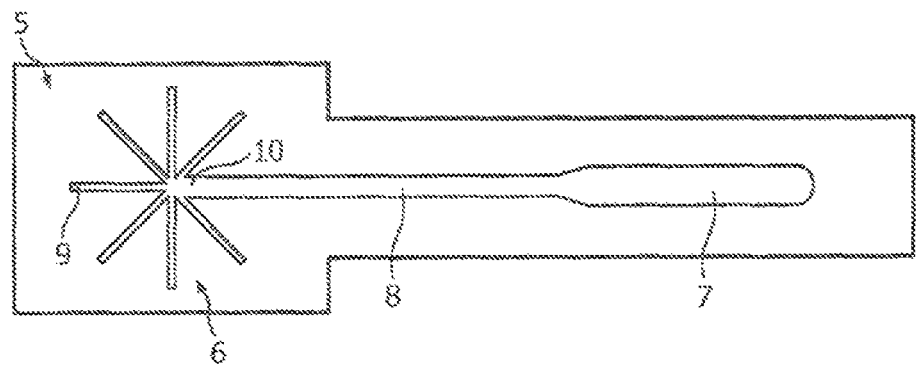
FIG. 2 shows schematically and exemplarily a top view on an adhesive capillary structure.
Figure 3:
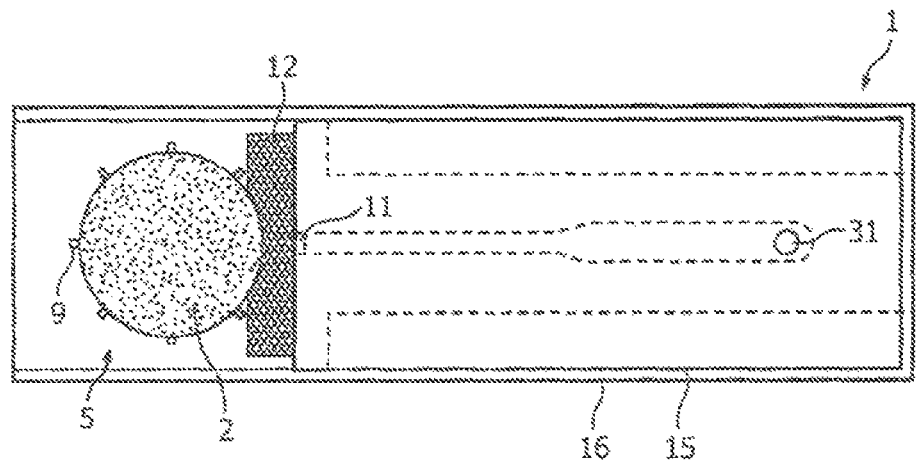
FIG. 3 shows schematically and exemplarily a top view on the filtering apparatus.
Figure 4:
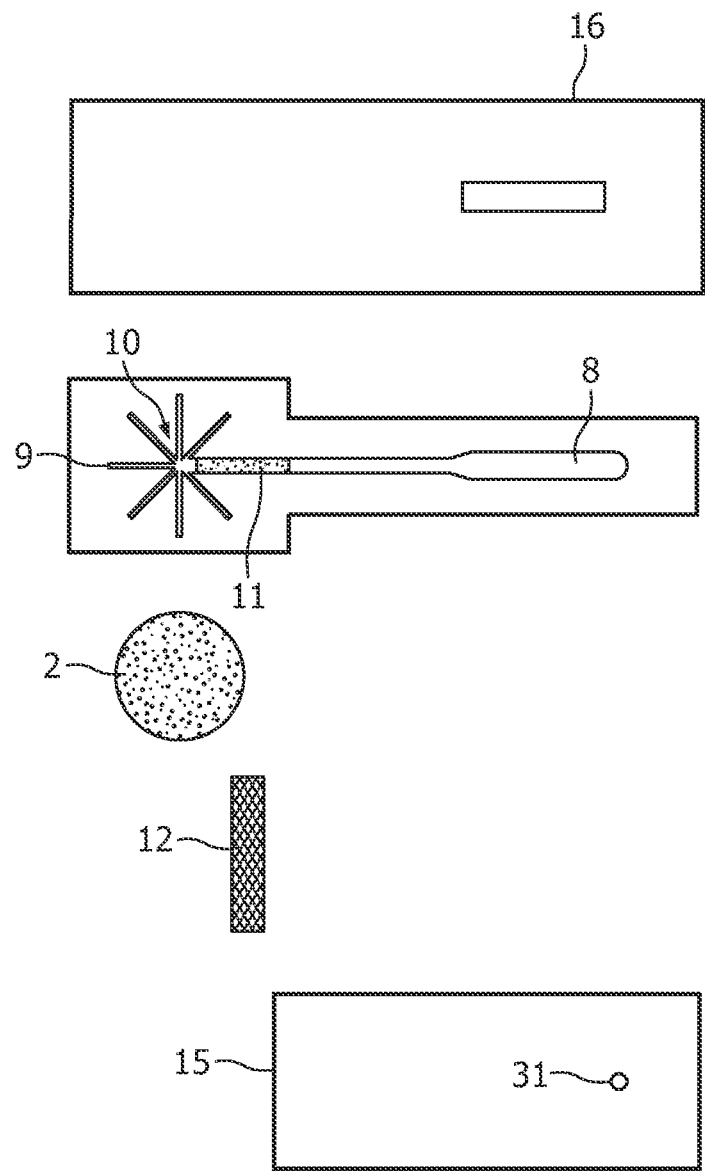
FIG. 4 shows schematically and exemplarily separate parts of the filtering apparatus.

The guiding channels 9 extend to a radius outside the filter element 2. This can be seen in FIG. 3 showing a top view on the filtering apparatus 1, which is shown in a sectional view in FIG. 1. The capillary structure 5 is shown in FIG. 2. FIG. 4 shows separate parts of the filtering apparatus 1 schematically and exemplarily.

FIG. 4 shows a transferring element 11 for transferring the fluid 3 in the direction of the detection location 7. This transferring element 11 is a cellulose strip located in the connecting channel 8 adjacent to the end 10 of this connecting channel 8. In other embodiments, the transferring element 11, in particular the cellulose strip could be located in at least one of the guiding channels 9 or in both, at least one of the guiding channels 9 and in the connecting channel 8. In other embodiments it may consist of a microfluidic structure, in particular microextrusions of grooves, that increase the capillary forces and effectively guide the fluid into the connecting fluidic channel towards the detection cavity, in particular the detection chamber.

The filtering apparatus 1 further comprises a bypass preventing unit 12 for preventing the fluid 3 from bypassing the filter element 2 and flowing directly into the connecting channel 8. The bypass preventing unit 12 is a strip, which is preferably made of a material, through which the fluid cannot pass and which is located between the connecting channel 8 and the filter element 2 to exclude the possibility that a part of the fluid sample bypasses the filter element 2 at that point. In another embodiment, the filter element in the direction of the connecting channel is extended such that a direct bypass in the connecting channel is prevented.

The filtering apparatus comprises a detection cavity 14, which is located at the detection location 7 and in which a property of the fluid 3 is detectable. This detection cavity 14 is formed by a first part 15 and a second part 16 of the filtering apparatus 1 together with the capillary structure 5. In addition, the first part 15 and the second part 16 form together with the capillary structure 5 the connecting channel 8. The first part 15 and the second part 16 are attached to each other via the adhesive capillary structure. The first part 15 and the second part 16 are plastic parts, which are injection molded and preferentially transparent for visible light. The first part 15 can be regarded as an upper substrate or a closing element or cover element and the second part 16 can be regarded as a lower substrate or a base element of the filtering apparatus 1. In an embodiment, the capillary structure 5 can be adapted for sealing an edge of the filter element 2.

Figure 12:
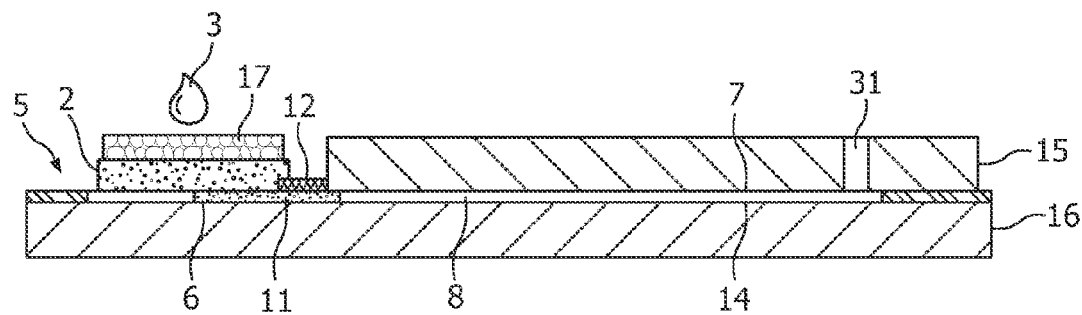
FIG. 12 shows schematically and exemplarily a sectional view of an embodiment of a filtering apparatus.

The filtering apparatus 1 optionally comprises a deposition medium 17, which is arranged on the filter element 2, for deposition of the fluid 3 on the filter element 2. An embodiment with a deposition medium 17 is schematically and exemplarily shown in FIG. 12.

The first part 15 comprises a vent 31 for allowing a gas leaving the capillary structure 5.

In this embodiment, the filter element 2 is a blood separation filter and the filtering apparatus 1 forms a cartridge, which is preferentially disposable. The blood separation filter is preferentially a cross-flow blood separation filter. The filtering apparatus 1 is preferentially used in point-of-care diagnostics. Since the filter element is attached to the capillary structure by adhesive properties of the adhesive capillary structure, the dead volume between the filter element and the detection cavity is kept small, thereby increasing the capillary properties and the capillary forces of the filtering apparatus. In particular, the capillary structure is formed such that the fluid is pulled through the filter element and transferred to the detection location by capillary force only.

The filtering apparatus is preferentially adapted for detecting a low concentration biomarker in a sample of whole blood, in particular in a finger prick sample of, for example, 25 μL. The detection location preferentially comprises an immunoassay.

The filter element 2 is preferentially adapted for extracting blood plasma from the whole blood to guarantee optimal functioning of the immunoassay. Furthermore, the filtering apparatus is preferentially adapted such that only capillary forces are the driving forces for fluid transport, in order to keep the cartridge simple, robust and inexpensive. Furthermore, the capillary structure, which contains preferentially a cellulose strip, is preferentially fine enough to generate enough driving force to pull the plasma fraction of the whole blood sample through the filter element. The filter element is preferentially adapted as a cross-flow filter, wherein the cross-flow filter is large enough for filtering without clogging and for inducing a moderate pressure drop. The attached and preferentially underlying capillary structure comprises preferentially a volume which is small enough for generating the necessary capillary force by means of narrow channels and for transporting the limited sample volume.

Since the filter element is attached to the capillary structure using the adhesive properties of the adhesive capillary structure, the filter element does not have to be pressed against a supporting capillary structure to limit the dead volume under the filter. Structures in contact with the filter tend to effectively reduce the sample volume, because blood adheres to such structures by capillary forces. By using the adhesive capillary structure, in particular by using the double-sided tape comprising the capillary structure, the dead volume under the filter element is well defined by the layout of the adhesive capillary structure. Preferentially, a balance between a maximum flow and minimum dead volume is adjusted by optimizing the layout of the adhesive capillary structure, in particular, by optimizing the thickness of the adhesive capillary structure, in particular, of the double-sided tape. Minimizing and controlling the dead volume under the filter helps to reduce the necessary fluid sample volume.

The filter element is preferentially a blood separation filter, in particular an asymmetric membrane filter, for example, a Pall filter. The filter element is preferentially a cross-flow filter and has preferentially a large pore diameter at the side, on which the fluid is to be placed, of about 100 μm and a very small pore diameter of about 1 μm at the opposite side of the filter element, so that the cells in the blood are obstructed by size exclusion.

The guiding channels 9 extend to a radius outside the filter element 2 in particular to avoid trapping of air bubbles.

Figure 5:
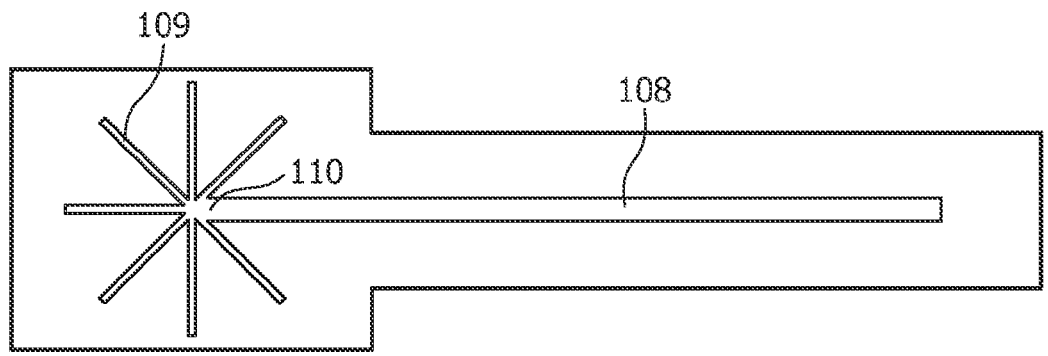
FIGS. 5 to 7 show different embodiments of the adhesive capillary structure.
Figure 6:
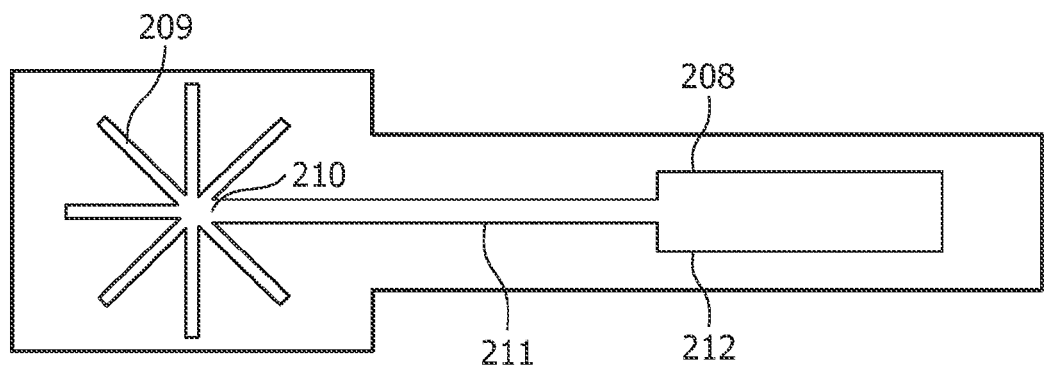
Figure 7:
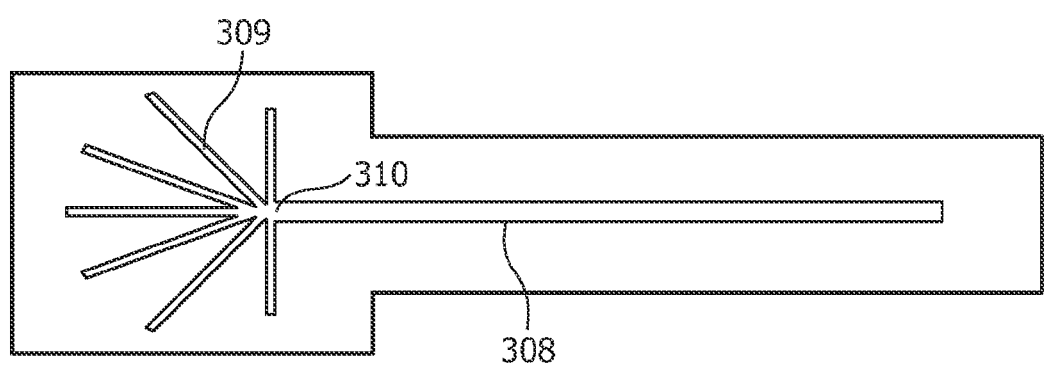

FIGS. 5 to 7 show schematically and exemplarily further possible embodiments of an adhesive capillary structure. In FIG. 5, the end 110 of the connecting channel 108, which will be located at the filtering location, is centered with respect to the filter element, wherein the guiding channels 109 extend radially from the end 110. In FIG. 6 the connecting channel 208 comprises a part 211, which has the smaller width than a further part 212 of the connecting channel 208. The width of the guiding channels 209, which also extend from a centered end 210 of the connecting channel 208, have a larger width than in FIG. 5. In FIG. 7, the end 310 of the connecting channel 308 is not centered with respect to the filter element and the guiding channels 309 extend only from the end 310 and a side opposite the end 310 of the connecting channel 308 in a direction away from the connecting channel 308.

The layout of the capillary structure is preferentially adapted for optimizing the total time to fill the detection location with fluid, in particular, with blood plasma.

The filter element can be uncovered, i.e. the side of the filter element opposite to the side, which is attached to the capillary structure, can be uncovered. In other embodiments, this side of the filter element can be covered. In particular, in this embodiment, the deposition medium is arranged on the filter element for deposition of the fluid on the filter element and for keeping the fluid, which is preferentially a blood sample, in place after deposition, thus, the deposition medium can act as a shock proof. The pore size of the deposition medium is preferentially larger, in particular much larger, than the pore size of the filter element and preferentially also larger than the characteristic size of the microfluidic channels, i.e. the guiding channels and/or the connecting channel, that guide the filtered fluid to the detection location. So the pore diameter is preferentially in the range from 0.3 mm-3 mm.

Figure 13:
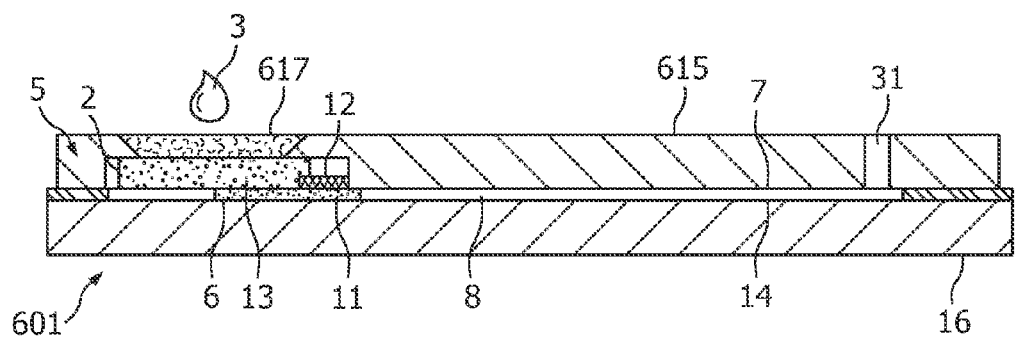
FIG. 13 shows schematically and exemplarily a sectional view of another embodiment of a filtering apparatus.
Figure 14:
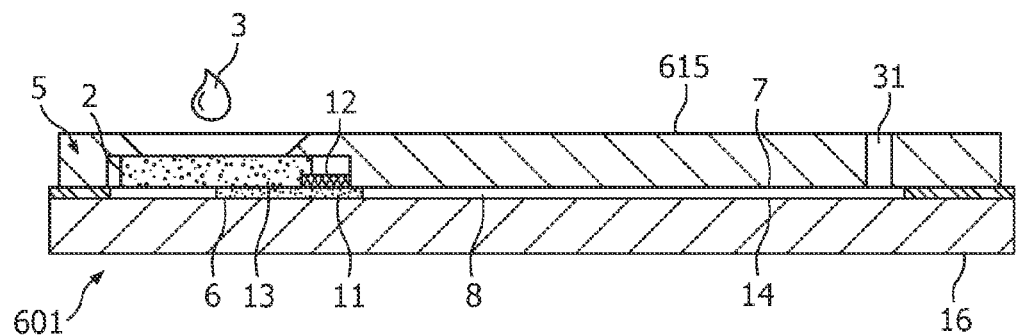
FIG. 14 shows schematically and exemplarily a sectional view of a further embodiment of a filtering apparatus.

FIG. 13 shows schematically and exemplarily a further embodiment 601 of a filtering apparatus. Similar elements in FIGS. 1, 3 and 4 and in FIGS. 13 to 16 are indicated by similar reference signs. For a more detailed description of these elements reference is made to the above description with respect to FIGS. 1 to 4.

In FIG. 13 the first part 615 comprises a preferentially circular opening 13, which forms a filtering cavity or a filtering chamber, if the first part 615 is attached to the second part 16. The filter element 2 is located in the filtering cavity 13. Also the bypass preventing unit 12 is preferentially located in the filtering cavity 13. The opening in the first part 615 has a first section, which is preferentially cylindrical and which forms the filtering cavity, and a second section, in which a deposition material 617 is preferentially located. The section, in which the deposition medium 617 is preferentially located and also the deposition medium 617 itself, are preferentially conically shaped. The sides of the second section of the opening in the first part 615 are preferentially inclined, preferentially such that the second section has at a position close to the filter element 2 a smaller diameter than at a position, which is more far away from the filter element 2. In another embodiment, which is schematically and exemplarily shown in FIG. 14, a deposition medium is not present.

Figure 15:
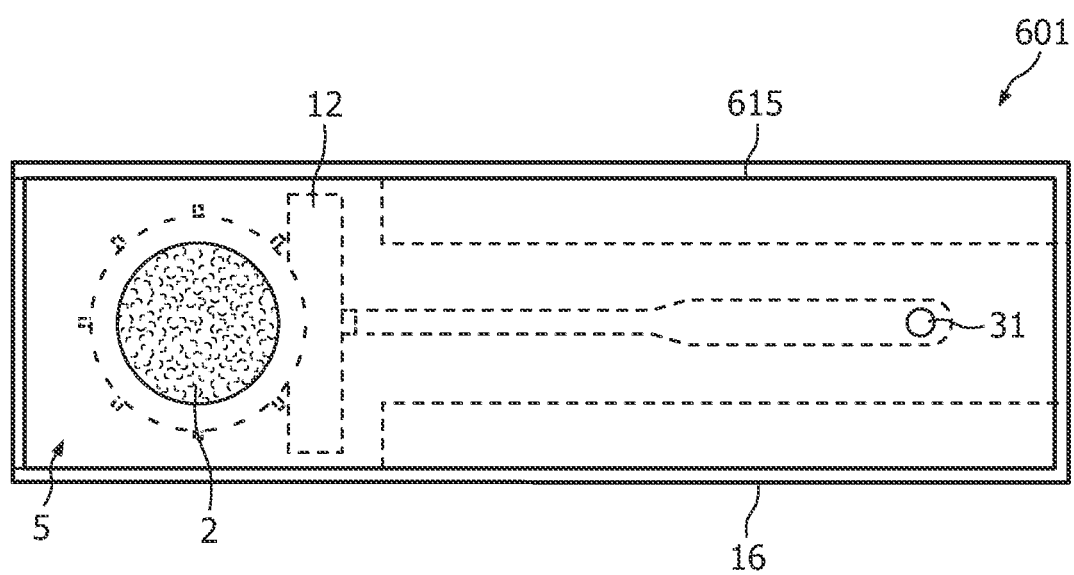
FIG. 15 shows schematically and exemplarily a top view on the embodiment of a filtering apparatus shown in FIG. 14
Figure 16:
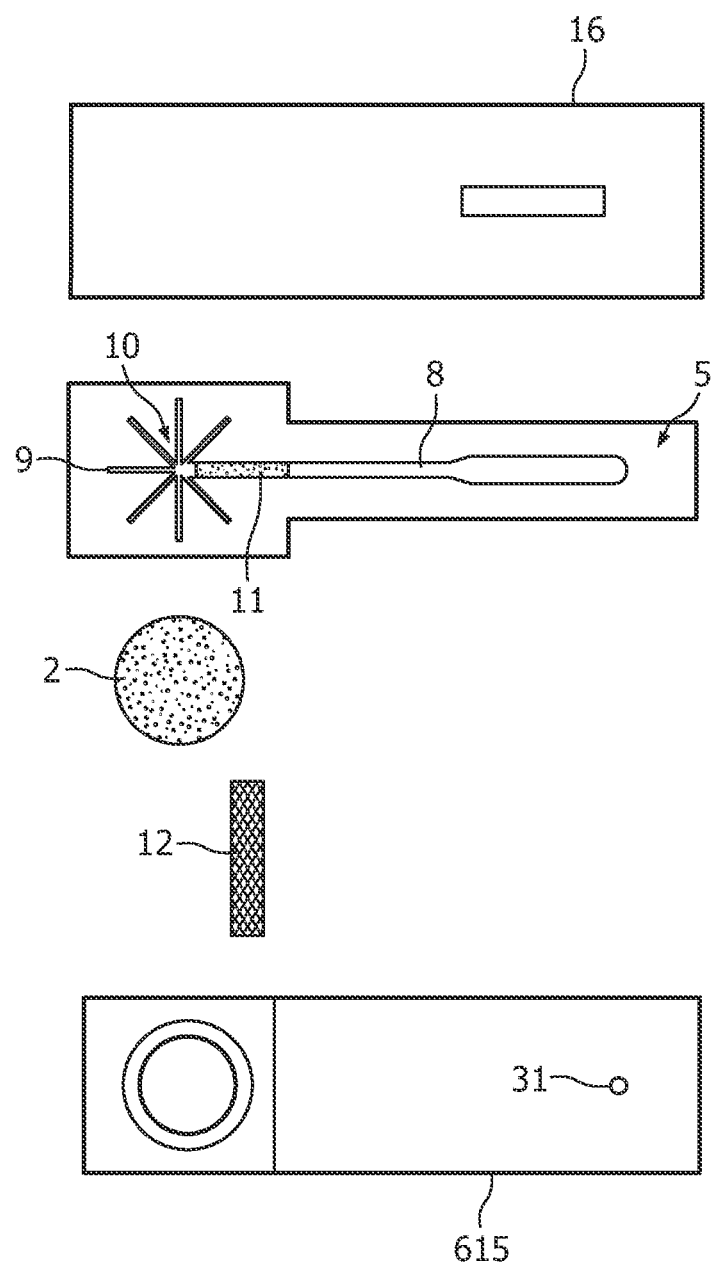
FIG. 16 shows schematically and exemplarily separate parts of the embodiment of a filtering apparatus shown in FIG. 14.

FIG. 15 shows a top view on the embodiment 601 shown in FIG. 13 and FIG. 16 shows separates parts of the embodiment 601 shown in FIG. 13.

Figure 8:
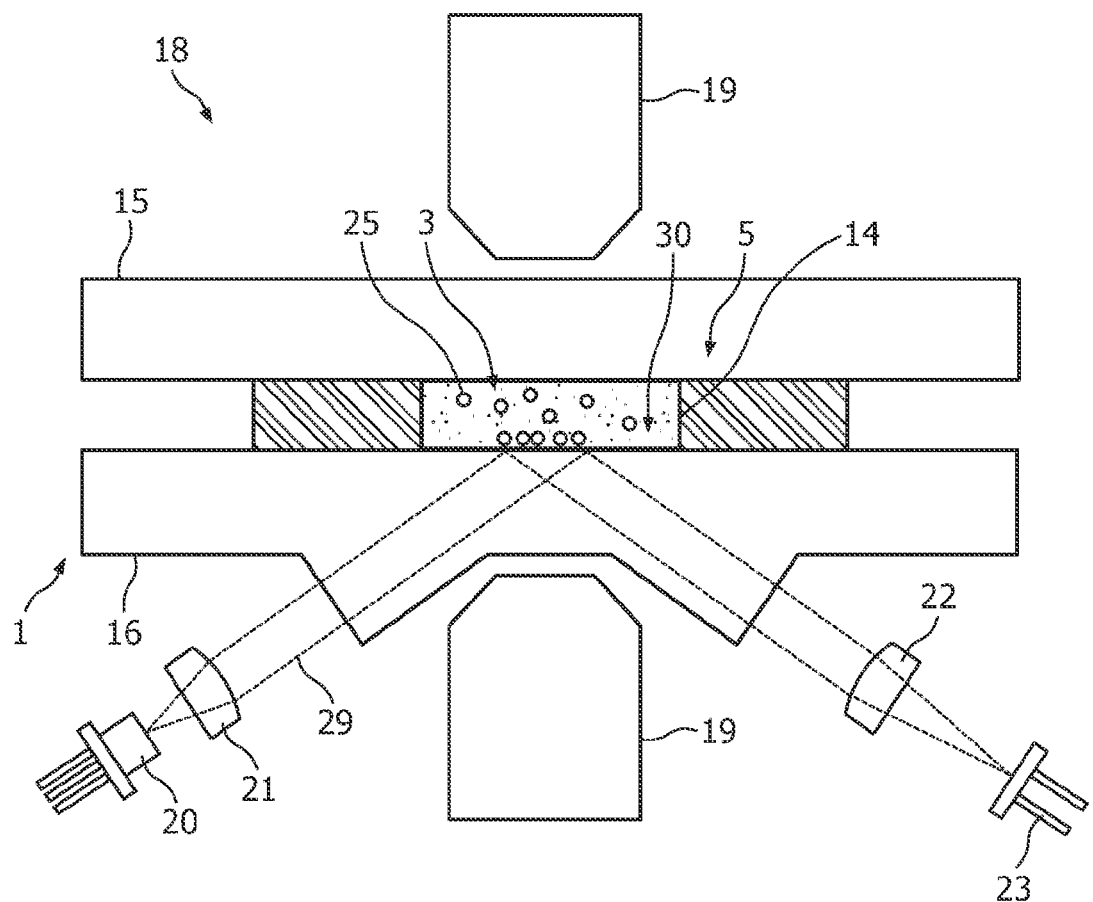
FIG. 8 shows schematically and exemplarily an embodiment of a property determination apparatus.

FIG. 8 shows schematically and exemplarily a property determination unit 18 for determining a property of a fluid 3, wherein the property determination apparatus 18 is adapted for determining a property of the fluid 3, which is located in the detection cavity 14 of the filtering apparatus 1. The property determination apparatus 18 comprises, in this embodiment, a magnetic element 19, which provides a magnetic field for forcing magnetic particles within the detection cavity 14 onto a surface 30 of the second part 16 of the filtering apparatus 1. The magnetic particles 25 on the surface 30 of the second part 16 of the filtering apparatus 1 are detected by, in this embodiment, illuminating this surface with a light beam 29 generated by a light source 20, which is, for example, a laser device or a LED, and by detecting the light reflected from the surface by a detector 23. The detector 23 is, for example, a photo detector or a two-dimensional camera. Optical elements 21 and 22 can be arranged in the light beam 29 for generating parallel light or focusing the light beam 29, respectively. The optical elements 21, 22 are preferentially lenses.

The configuration sketched in FIG. 8 shows a detection of changes at a surface using the FTIR method (frustrated total internal reflection). If a beam of light reflects on the interface between a medium with a higher refractive index, for example the second part 16, and a lower refractive index, for example the fluid, there is a certain critical angle of incidence above which there is a situation of total internal reflection (TIR). The present detection configuration (regarding refractive indices and angle of incidence) is such that there is total internal reflection of the incoming beam. Although the light is totally refleted in such a situation, there is still penetration of the light in a very thin layer of the medium with the low refractive index. This is called evanescent light, the intensity of which decays exponentially in the low refractive index medium with a characteristic penetration depth of the order of the wavelength of the light. So, in practice the penetration depth is preferentially less than 0.5 micrometer. If magnetic particles stick to the surface, the optical properties of this very thin first fluid layer of preferentially about 0.5 micrometer are changed leading to a reduction of the reflected light beam. This is caused by absorption and scattering of the evanescent light (FTIR; frustrated total internal reflection). As a result the signal of the photodetector changes.

Figure 9:
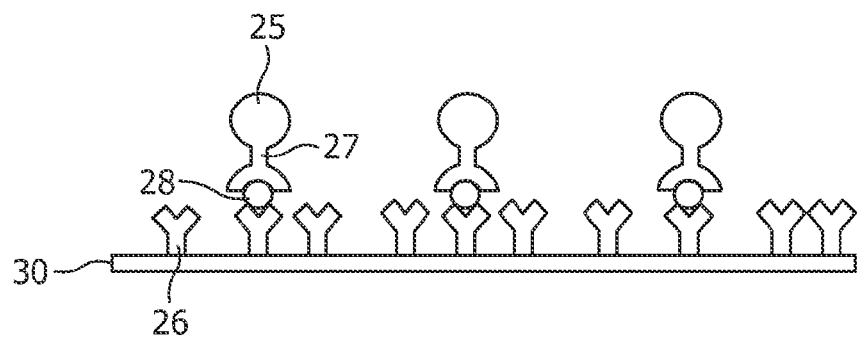
FIG. 9 shows schematically and exemplarily magnetic particles attached to a surface of a second part of the filtering apparatus.

The objective is preferentially to detect specific target molecules or larger objects in the fluid. In the example sketched in FIG. 9 this is realized by a so-called sandwich assay. Magnetic beads 25 are coated with a specific antibody 27 that attaches to a target molecule 28 present in the fluid. When the magnetic beads that are freely present in the fluid have reacted with the available target molecules the beads are attracted to the cartridge surface 30 that has been coated with another antibody 26 that can couple to a target molecule. After a sufficiently long reaction time the magnetic field is switched such that the magnetic beads are pulled upwards so that only the specifically bound beads with the correct target molecules stay attached to the surface. At that moment the optical detector can be read out and gives a signal that carries the information on the amount of target molecules in the fluid. So the detection location, in particular the surface 30, in particular a detection spot in the cartridge, is preferentially covered with a biolayer with antibodies.

Figure 10:
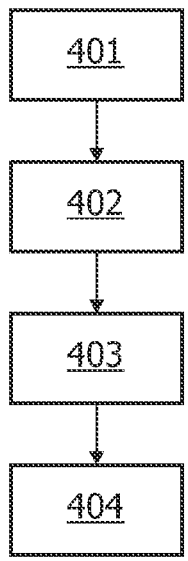
FIG. 10 shows a flow chart illustrating a filtering method for filtering a fluid.

In the following a filtering method for filtering a fluid will exemplarily be described with respect to a flow chart shown in FIG. 10.

In step 401, a fluid sample, in particular, a blood sample, is arranged on the deposition medium.

In step 402, the fluid is filtered by the filter element 2, and in step 403, the filtered fluid is transported to the detection location by the capillary forces generated by the connecting channel and the guiding channels of the capillary structure 5. In step 404, a property of the fluid is determined by the property determination unit 18.

Figure 11:
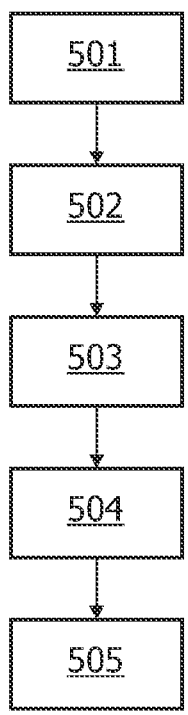
FIG. 11 shows a flow chart illustrating a method for producing a filtering apparatus for filtering a fluid.

In the following a method for producing a filtering apparatus for filtering a fluid will schematically and exemplarily be explained with reference to a flow chart shown in FIG. 11.

In step 501, a filter element for filtering a fluid is provided. In step 502, an adhesive material is provided, and in step 503, a capillary structure is formed in the adhesive material for generating capillary forces. In other embodiments, instead of steps 502 and 503 a single step of providing an adhesive capillary structure can be performed, for example, by providing a plastic injection molded microstructure that is covered with an adhesive material. In step 504, the adhesive capillary structure is attached to the filter element by using the adhesive properties of the adhesive capillary structure. In a preferred further step 505, a first part and a second part are attached to each other with the adhesive capillary structure in between, thereby forming a filtering cavity, a detection cavity, a connecting channel and guiding channels, wherein a fluid, which has been filtered, is transportable from the filtering cavity to the detection cavity via the guiding channels and the connecting channel.

In the above described embodiment, the fluid was preferentially blood. In other embodiments, the fluid can be any other fluid, in particular, any other body fluid, like saliva or urine. The preferred application for the filtering apparatus and for the property determination apparatus is in the field of point-of-care diagnostics, in particular, based on a finger prick blood sample, like a cardiac marker detection application. But, the filtering apparatus can also be adapted for filtering and/or debubbling of other fluids, like saliva for Drugs Of Abuse.

In the above described embodiment, the property determination apparatus uses evanescent field techniques for determining the amount of magnetic particles on the surface. In other embodiments, other techniques can be used for determining these particles. For example, magnetic methods, sonic detection, electrical detection and combinations therefore can be used. Furthermore, the property determination apparatus can comprise any sensor based on the detection of the magnetic properties of the particle on or near to a sensor surface. A property determination apparatus can be adapted for detecting molecular targets, which often determine the concentration and/or presence of larger moieties, for example, cells, viruses, fractions of cells or fractions of viruses, tissue extract etc. The magnetic particles can be detected directly by the sensing method. As well, the particles can be further processed prior to detection, an example of further processing is that materials are added or that the chemical of biochemical of physical properties of the magnetic labels are modified to facilitate detection. The property determination apparatus can be adapted for working together with several biochemical assay types, for example, binding/unbinding assay, sandwich assay, competition assay, displacement assay, enzymatic assay etc. The filtering apparatus and the property determination apparatus can be adapted for sensor multiplexing, i.e. the parallel use of different sensors and sensor surfaces, label multiplexing, i.e. the parallel use of different types of labels, and chamber multiplexing, i.e. the parallel use of different reaction chambers. The filtering apparatus and the property determination apparatus can be used as rapid, robust and easy to use point-of-care biosensors for small sample volumes. The detection cavity is preferentially a part of a disposable cartridge, which is to be used with the property determination apparatus, which contains one or more magnetic field generating means, i.e. the magnetic element, and one or more detection means. The filtering apparatus and the property determination apparatus can preferentially be adapted for a use in automated high-throughput testing.

The magnetic particles are preferentially nano-particles having at least one dimension ranging between 3 nm and 5000 nm, preferably between 10 nm and 3000 nm, more preferred between 50 nm and 1000 nm.

In another embodiment, the first part and the second part of the filtering apparatus can be foils, which are attached to each other via the adhesive capillary structure, in particular, via the double-sided tape comprising the capillary structure, thereby forming a filtering cavity, a detection cavity, guiding channels and a connecting channel.

Other variations to the disclosed embodiment can be understood and effected by those skilled in the art in practising the claimed invention, from a study of the drawings, the disclosure and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A filtering apparatus for filtering a fluid, the filtering apparatus comprising:
   a filter element for filtering the fluid; and
   an adhesive capillary structure for generating capillary forces,
   wherein the adhesive capillary structure is attached to the filter element by using an adhesive property of the adhesive capillary structure,
   wherein the capillary structure is configured to seal an edge of the filter element.

2. The filtering apparatus as defined in claim 1, wherein the adhesive capillary structure is made of a double-sided tape, which is adhesive on two sides.

3. The filtering apparatus as defined in claim 1, wherein the filtering apparatus further comprises:
   a filtering location at which the filter element is located, and a detection location at which a property of the fluid is detectable,
   wherein the capillary structure is formed such that the filtered fluid is guided from the filtering location to the detection location.

4. The filtering apparatus as defined in claim 3, wherein the capillary structure comprises a connecting channel connecting the filtering location with the detection location, wherein the capillary structure comprises guiding channels located at the filtering location and wherein the guiding channels extend from an end of the connecting channel.

5. The filtering apparatus as defined in claim 1, wherein the filtering apparatus comprises a deposition medium, which is arranged on the filter element for deposition of the fluid on the filter element.

6. A filtering apparatus for filtering a fluid, the filtering apparatus comprising:
   a filter element for filtering the fluid;
   an adhesive capillary structure for generating capillary forces; and
   a filtering location at which the filter element is located, and a detection location at which a property of the fluid is detectable,
   wherein the capillary structure is formed such that the filtered fluid is guided from the filtering location to the detection location,
   wherein the adhesive capillary structure is attached to the filter element by using an adhesive property of the adhesive capillary structure,
   wherein the capillary structure comprises a connecting channel connecting the filtering location with the detection location,
   wherein the capillary structure comprises guiding channels located at the filtering location and wherein the guiding channels extend from an end of the connecting channel, and
   wherein the guiding channels extend radially from the end of the connecting channel.

7. A filtering apparatus for filtering a fluid, the filtering apparatus comprising:
   a filter element for filtering the fluid;
   an adhesive capillary structure for generating capillary forces; and
   a filtering location at which the filter element is located, and a detection location at which a property of the fluid is detectable,
   wherein the capillary structure is formed such that the filtered fluid is guided from the filtering location to the detection location,
   wherein the adhesive capillary structure is attached to the filter element by using an adhesive property of the adhesive capillary structure,
   wherein the capillary structure comprises a connecting channel connecting the filtering location with the detection location,
   wherein the capillary structure comprises guiding channels located at the filtering location and wherein the guiding channels extend from an end of the connecting channel, and
   wherein the guiding channels have a smaller width than the connecting channel.

8. A filtering apparatus for filtering a fluid, the filtering apparatus comprising:
   a filter element for filtering the fluid;
   an adhesive capillary structure for generating capillary forces; and
   a filtering location at which the filter element is located, and a detection location at which a property of the fluid is detectable,
   wherein the capillary structure is formed such that the filtered fluid is guided from the filtering location to the detection location,
   wherein the adhesive capillary structure is attached to the filter element by using an adhesive property of the adhesive capillary structure,
   wherein the capillary structure comprises a connecting channel connecting the filtering location with the detection location,
   wherein the capillary structure comprises guiding channels located at the filtering location and wherein the guiding channels extend from an end of the connecting channel, and
   wherein the guiding channels extend to a radius outside the filter element.

9. A filtering apparatus for filtering a fluid, the filtering apparatus comprising:
   a filter element for filtering the fluid;
   an adhesive capillary structure for generating capillary forces; and
   a filtering location at which the filter element is located, and a detection location at which a property of the fluid is detectable,
   wherein the capillary structure is formed such that the filtered fluid is guided from the filtering location to the detection location,
   wherein the adhesive capillary structure is attached to the filter element by using an adhesive property of the adhesive capillary structure,
   wherein the capillary structure comprises a connecting channel connecting the filtering location with the detection location,
   wherein the capillary structure comprises guiding channels located at the filtering location and wherein the guiding channels extend from an end of the connecting channel, and
   wherein at least one of the guiding channels and of the connecting channel contains a transferring element for transferring the fluid in the direction of the detection location.

10. A filtering apparatus for filtering a fluid, the filtering apparatus comprising:
    a filter element for filtering the fluid;
    an adhesive capillary structure for generating capillary forces; and
    a filtering location at which the filter element is located, and a detection location at which a property of the fluid is detectable,
    wherein the capillary structure is formed such that the filtered fluid is guided from the filtering location to the detection location,
    wherein the adhesive capillary structure is attached to the filter element by using an adhesive property of the adhesive capillary structure,
    wherein the capillary structure comprises a connecting channel connecting the filtering location with the detection location,
    wherein the capillary structure comprises guiding channels located at the filtering location and wherein the guiding channels extend from an end of the connecting channel, and
    wherein the filtering apparatus comprises a bypass preventing unit for preventing the fluid from bypassing the filter element and flowing directly into the connecting channel.

11. A filtering apparatus for filtering a fluid, the filtering apparatus comprising:
    a filter element for filtering the fluid;
    an adhesive capillary structure for generating capillary forces; and
    a filtering location at which the filter element is located, and a detection location at which a property of the fluid is detectable,
    wherein the capillary structure is formed such that the filtered fluid is guided from the filtering location to the detection location,
    wherein the adhesive capillary structure is attached to the filter element by using an adhesive property of the adhesive capillary structure,
    wherein the capillary structure comprises a connecting channel connecting the filtering location with the detection location,
    wherein the capillary structure comprises guiding channels located at the filtering location and wherein the guiding channels extend from an end of the connecting channel, and
    wherein the filtering apparatus further comprises:
    a detection cavity, which is located at the detection location and in which a property of the fluid is detectable,
    a first part and a second part, which form together the detection cavity and which form together with the capillary structure the connecting channel, wherein the first part and the second part are attached to each other via the adhesive capillary structure.

12. A property determination apparatus for determining a property of a fluid, wherein the property determination apparatus is adapted for determining a property of a fluid located at a detection location of a filtering apparatus for filtering a fluid, the filtering apparatus comprising:
    a filter element for filtering the fluid; and
    an adhesive capillary structure for generating capillary forces;
    wherein the adhesive capillary structure is attached to the filter element by using an adhesive property of the adhesive capillary structure, and
    wherein the filtering apparatus further comprises:
    a filtering location, at which the filter element is located, and the detection location, at which a property of the fluid is detectable,
    wherein the capillary structure is formed such that the filtered fluid is guided from the filtering location to the detection location, and
    wherein the capillary structure is configured to seal an edge of the filter element.

13. A filtering method for filtering a fluid comprising the acts of:
    providing an adhesive capillary structure; and
    filtering the fluid by a filter element, to which the adhesive capillary structure for generating capillary forces is attached by using the adhesive properties of the adhesive capillary structure,
    wherein the capillary structure is configure to seal an edge of the filter element.

14. A method for producing a filtering apparatus for filtering a fluid comprising the acts of:
- providing a filter element for filtering the fluid;
- providing an adhesive capillary structure for generating capillary forces; and
- attaching the adhesive capillary structure to the filter element by using an adhesive property of the adhesive capillary structure,
- wherein the capillary structure is configured to seal an edge of the filter element.

* * * * *